(12) United States Patent
Wang et al.

(10) Patent No.: US 12,017,557 B2
(45) Date of Patent: Jun. 25, 2024

(54) TORQUE CONTROL METHOD FOR VEHICLE, VEHICLE CONTROLLER, AND NON-TRANSITORY MACHINE-READABLE STORAGE MEDIUM

(71) Applicant: GREAT WALL MOTOR COMPANY LIMITED, Hebei (CN)

(72) Inventors: Yinlei Wang, Hebei (CN); Di Wu, Hebei (CN); Han Liu, Hebei (CN); Xiu Liu, Hebei (CN); Weifeng Deng, Hebei (CN); Wentao Hou, Hebei (CN); Baogang Wang, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 211 days.

(21) Appl. No.: 17/790,159

(22) PCT Filed: Jan. 5, 2021

(86) PCT No.: PCT/CN2021/070280
§ 371 (c)(1),
(2) Date: Jun. 30, 2022

(87) PCT Pub. No.: WO2021/169609
PCT Pub. Date: Sep. 2, 2021

(65) Prior Publication Data
US 2023/0041592 A1  Feb. 9, 2023

(30) Foreign Application Priority Data

Feb. 24, 2020 (CN) .......................... 202010113189.0

(51) Int. Cl.
*B60L 7/26* (2006.01)
*B60W 20/40* (2016.01)
*F16H 61/04* (2006.01)

(52) U.S. Cl.
CPC ............... *B60L 7/26* (2013.01); *B60W 20/40* (2013.01); *B60L 2240/423* (2013.01); *F16H 2061/0433* (2013.01)

(58) Field of Classification Search
CPC ...... B60L 7/26; B60L 2240/423; B60W 20/40
See application file for complete search history.

(56) References Cited

U.S. PATENT DOCUMENTS 5,615,933 A     4/1997  Kidston et al.
10,399,440 B2 *  9/2019  Zhao ..................... B60W 10/18
(Continued)

FOREIGN PATENT DOCUMENTS

CN    104590037 A    5/2015
CN    205632437 U    10/2016
(Continued)

OTHER PUBLICATIONS

International Search Report for PCT/CN2021/070280 issued Mar. 24, 2021.

*Primary Examiner* — George C Jin
(74) *Attorney, Agent, or Firm* — Schmeiser, Olsen & Watts, LLP (57) ABSTRACT

A torque control method and apparatus for a vehicle, including: determining whether a torque change request is received, during a process of performing an energy recovery function; determining whether an antilock brake system is in an active state, in case that the torque change request is not received; if so, decreasing an energy recovery torque with a first torque change gradient; determining whether the antilock brake system is transited from the activated state to a non-activated state, during a process of decreasing the energy recovery torque; if so, determining whether it is satisfied that a first current driver demand torque is greater than a first preset value and the antilock brake system is in the non-activated state for longer than a first preset time; and (Continued)

if satisfied, recovering the energy recovery torque to the first current driver demand torque with a second torque change gradient.

20 Claims, 3 Drawing Sheets

(56) References Cited

U.S. PATENT DOCUMENTS

| | | | | |
|---|---|---|---|---|
| 2014/0277983 A1* | 9/2014 | Bayar | ................. | B60L 7/26 |
| | | | | 701/71 |
| 2015/0274018 A1* | 10/2015 | Crombez | ............. | B60L 7/18 |
| | | | | 701/22 |
| 2015/0283983 A1* | 10/2015 | Georgi | ................. | B60L 7/18 |
| | | | | 701/70 |
| 2016/0031326 A1* | 2/2016 | Ueno | ................. | B60T 7/042 |
| | | | | 303/3 |
| 2017/0088105 A1* | 3/2017 | Elkenkamp | ........... | B60T 7/22 |
| 2017/0297452 A1* | 10/2017 | Cho | ..................... | B60L 7/18 |
| 2018/0093571 A1* | 4/2018 | Hall | ..................... | B60L 7/08 |
| 2018/0312146 A1* | 11/2018 | Lian | ............... | B60T 8/17616 |
| 2019/0111790 A1* | 4/2019 | Crombez | ............. | B60T 8/268 |

FOREIGN PATENT DOCUMENTS

| | | |
|---|---|---|
| CN | 106627171 A | 5/2017 |
| CN | 106926709 A | 7/2017 |
| CN | 108583566 A | 9/2018 |
| CN | 108859778 A | 11/2018 |
| CN | 110040000 A | 7/2019 |
| CN | 110667396 A | 1/2020 |
| JP | 2013018332 A | 1/2013 |

\* cited by examiner

TORQUE CONTROL METHOD FOR VEHICLE, VEHICLE CONTROLLER, AND NON-TRANSITORY MACHINE-READABLE STORAGE MEDIUM

CROSS-REFERENCE TO RELATED APPLICATIONS

This application claims priority to PCT Application No. PCT/CN2021/070280, having a filing date of Jan. 5, 2021, which claims priority to Chinese Application No. 202010113189.0, having a filing date of Feb. 24, 2020, the entire contents both of which are incorporated herein by reference.

FIELD OF TECHNOLOGY

The following relates to the field of vehicle technology, and more particularly to a torque control method and a torque control apparatus for a vehicle.

BACKGROUND

In a current hybrid or pure electric vehicle having a chassis control system including an electronic stability program (ESP) system, it is adopted a processing strategy that the chassis control system is used as a main control unit, and the vehicle power system completely responds to a chassis torque request. However, this processing strategy only considers the safety performance of the vehicle but considers less about the comfort performance of the vehicle.

In particular, the hybrid or pure electric vehicle will activate an energy recovery function under braking and coasting conditions. During the energy recovery process, the wheels may lock up, and an antilock brake system (ABS) is activated, especially when driving on a low tire-road friction condition, the wheels may lock frequently, and the ABS may be activated frequently, resulting in shaking phenomenon and relatively poor comfort performance of the vehicle body.

SUMMARY

An aspect relates to a torque control method for a vehicle, so as to tackle the technical problem of shaking phenomenon during the energy recovery process of the vehicle.

To achieve the above aspect, the present application adopts the following technical solutions:

A torque control method for a vehicle, comprises the following steps: determining whether a torque change request is received, during a process of performing an energy recovery function; determining whether an antilock brake system is in an active state, in case that the torque change request is not received; decreasing an energy recovery torque with a first torque change gradient, in case that the antilock brake system is in the active state, wherein the energy recovery torque is restricted to that a minimum value thereof is decreased to a preset torque, and a size of the preset torque is greater than 0; determining whether the antilock brake system is transited from the activated state to a non-activated state, during a process of decreasing the energy recovery torque; determining whether it is satisfied that a first current driver demand torque is greater than a first preset value and the antilock brake system is in the non-activated state for longer than a first preset time, in case that the antilock brake system is transited from the activated state to the non-activated state; and recovering the energy recovery torque to the first current driver demand torque with a second torque change gradient, when it is satisfied that the first current driver demand torque is greater than the first preset value and the antilock brake system is in the non-activated state for longer than the first preset time.

Furthermore, the torque control method for the vehicle further comprises: maintaining, during the process of decreasing the energy recovery torque when the energy recovery torque is decreased to the preset torque and the antilock brake system is in the activated state, the energy recovery torque to be the preset torque until the antilock brake system is transited from the activated state to the non-activated state.

Furthermore, the torque control method for the vehicle further comprises: returning to the step of decreasing the energy recovery torque with the first torque change gradient, when it is satisfied that the first current driver demand torque is greater than the first preset value and the antilock brake system is in the non-activated state for longer than the first preset time.

Furthermore, the torque change request is configured to instruct a torque increase or a torque decrease and to instruct a target torque. The torque control method for the vehicle further comprises: executing, in case of receiving the torque change request, a corresponding torque decrease or torque increase on the energy recover torque with a third torque change gradient, so as to adjust the energy recovery torque to the target torque; determining whether the torque change request is exited; and recovering the energy recovery torque to a second current driver demand torque with a second torque change gradient, in case that the torque change request is exited.

Furthermore, at least one of the following features is defined: the first torque change gradient is smaller than 400 N·m/S; the second torque change gradient is smaller than 600 N·m/S; or the third torque change gradient is smaller than 800 N·m/S.

Furthermore, the first torque change gradient is set to satisfy that the energy recovery torque, when being decreased with the first torque change gradient, is enabled to be decreased to the preset value within the preset time.

Compared with the conventional technology, the torque control method for the vehicle according to the present application has the following advantages:

In the process of performing energy recovery, if the torque change request is not received and the ABS is in the activated state, then the energy recovery torque is decreased, during which, it is determined whether the ABS has been transited from the activated state to the non-activated state. If the ABS has been transited from the activated stated to the non-activated stated, then it is further determined whether it is satisfied that the first current driver demand torque is greater than the first preset value and the ABS is in the non-activated state for longer than the first preset time, if both conditions are satisfied, the energy recovery torque is recovered with the second torque change gradient to the first current driver demand torque. That is to say, in case that the driver demand torque is greater than the first preset value and the ABS is completely in the non-activated state, the energy recovery torque is recovered again. In this way, frequent vehicle motion caused by frequent activation of the ABS can be avoided, thereby improving the comfort of the vehicle.

It is another object of the present application to provide a torque control apparatus for a vehicle, so as to tackle the technical problem of shaking phenomenon during the energy recovery process of the vehicle.

To achieve the above object, the present application adopts the following technical solutions:

A torque control apparatus for a vehicle comprises: a first determination module, a second determination module, a first decrease module, a third determination module, a fourth determination module, and a first recovery module. The first determination module is configured for determining whether a torque change request is received, during a process of performing an energy recovery function. The second determination module is configured for determining whether an antilock brake system is in an active state, in case that the torque change request is not received. The first decrease module is configured for decreasing an energy recovery torque with a first torque change gradient, in case that the antilock brake system is in the active state, in which, the energy recovery torque is restricted to that a minimum value thereof is decreased to a preset torque, and a size of the preset torque is greater than 0. The third determination module is configured for determining whether the antilock brake system is transited from the activated state to a non-activated state, during a process of decreasing the energy recovery torque. The fourth determination module is configured for determining whether it is satisfied that a first current driver demand torque is greater than a first preset value and the antilock brake system is in the non-activated state for longer than a first preset time, in case that the antilock brake system is transited from the activated state to the non-activated state. The first recovery module is configured for recovering the energy recovery torque to the first current driver demand torque with a second torque change gradient, when it is satisfied that the first current driver demand torque is greater than the first preset value and the antilock brake system is in the non-activated state for longer than the first preset time.

Furthermore, the torque control apparatus for the vehicle further comprises: a maintenance module, configured for maintaining, during the process of decreasing the energy recovery torque when the energy recovery torque is decreased to the preset torque and the antilock brake system is in the activated state, the energy recovery torque to be the preset torque until the antilock brake system is transited from the activated state to the non-activated state.

Furthermore, the torque control apparatus for the vehicle further comprises: a returning module, configured for returning to the step of decreasing the energy recovery torque with the first torque change gradient, when it is satisfied that the first current driver demand torque is greater than the first preset value and the antilock brake system is in the non-activated state for longer than the first preset time.

Furthermore, the torque change request is configured to instruct a torque increase or a torque decrease and to instruct a target torque. The torque control apparatus for the vehicle further comprises: a torque adjustment module, a fifth determination module, and a second recovery module. The torque adjustment module is configured for executing, in case of receiving the torque change request, a corresponding torque decrease or torque increase on the energy recover torque with a third torque change gradient, so as to adjust the energy recovery torque to the target torque. The fifth determination module is configured for determining whether the torque change request is exited. The second recovery module is configured for recovering the energy recovery torque to a second current driver demand torque with a second torque change gradient, in case that the torque change request is exited.

Furthermore, at least one of the following features is defined: the first torque change gradient is smaller than 400 N·m/S; the second torque change gradient is smaller than 600 N·m/S; or the third torque change gradient is smaller than 800 N·m/S.

Furthermore, the first torque change gradient is set to satisfy that the energy recovery torque, when being decreased with the first torque change gradient, is enabled to be decreased to the preset value within the preset time.

The torque control apparatus for the vehicle has the same advantages as the torque control method for the vehicle as described in the above, when compared with the conventional technology, which will not be repeated herein.

Correspondingly, embodiments of the present application further provide a machine-readable storage medium, comprising instructions which, when executed by a machine, cause the machine to carry out the torque control method for the vehicle as described in the above.

Other features and advantages of the present application will be described in details in the following detailed description of the embodiments.

BRIEF DESCRIPTION

Some of the embodiments will be described in detail, with reference to the following figures, wherein like designations denote like members, wherein.

The following reference numerals are adopted: 310: First determination module; 320: Second determination module; 330: First decrease module; 340: Third determination module; 350: Fourth determination module; and 360: First recovery module.

DETAILED DESCRIPTION

It should be noted that the embodiments of the present application and the features of the embodiments may be combined with each other in conditions of no conflict.

The present application will be described in detail below with reference to the accompanying drawings and in conjunction with the embodiments.

Figure 1:
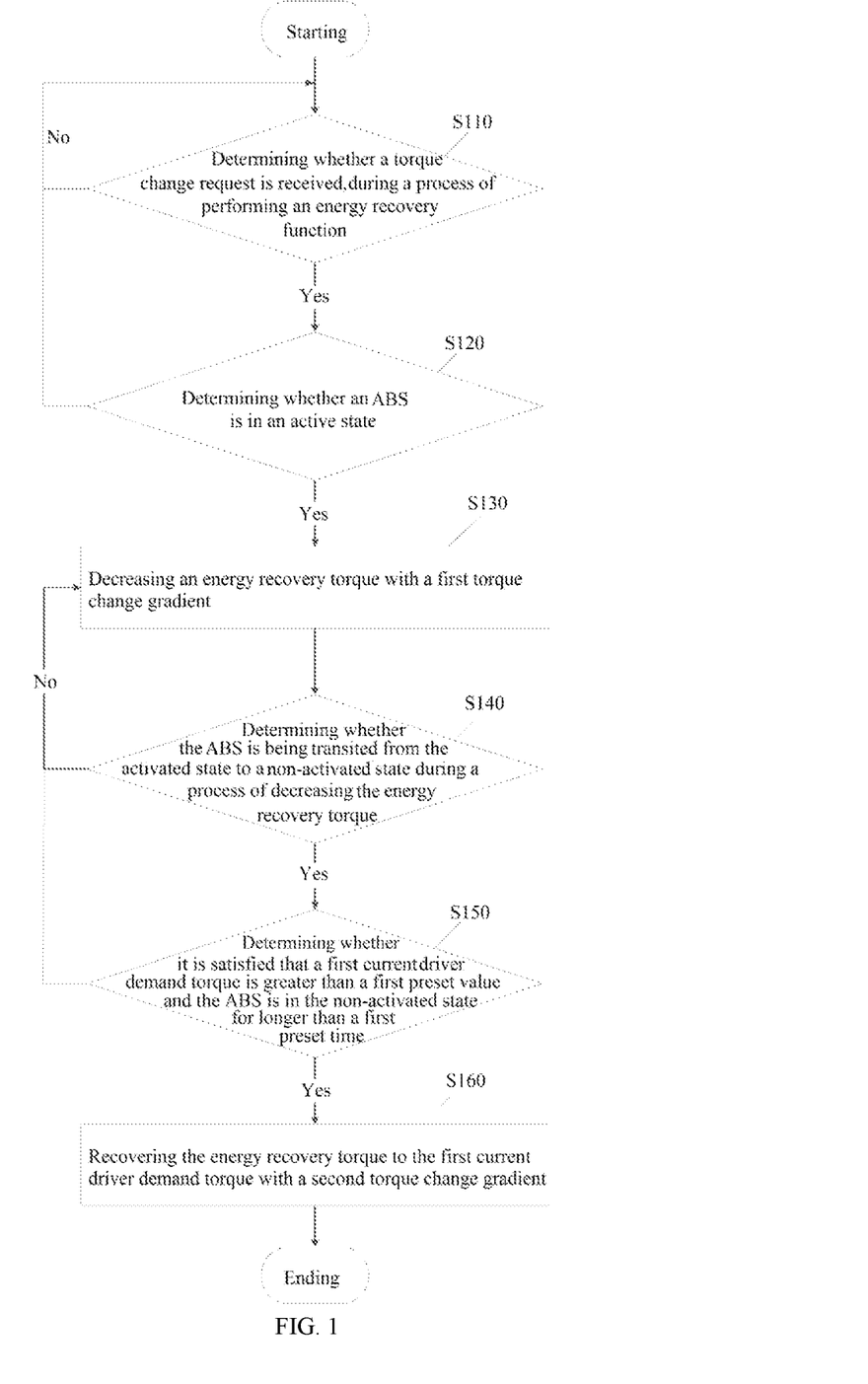
FIG. 1 is a flowchart of a torque control method for a vehicle according to an embodiment of the present application.

FIG. 1 shows a flowchart schematic diagram of a torque control method for a vehicle according to an embodiment of the present application. As shown in FIG. 1, the embodiment of the present application provides a torque control method for a vehicle. The method may be executed by a vehicle controller of a hybrid vehicle or a pure electric vehicle. The torque control method for the vehicle may comprise steps S110 to S160.

In step S110, during a process of performing an energy recovery function, it is determined whether a torque change request is received.

When the hybrid vehicle or the pure electric vehicle is under a braking or coasting condition, in order to increase the cruising range of the vehicle and reduce the energy consumption, the vehicle controller will drive the motor to perform energy recovery. During the execution of the energy recovery function, the ESP system may adjust a body posture of the vehicle according to a current vehicle state, in which process, the ESP system is required to send the torque change request to the vehicle controller, and the vehicle controller receives the torque change request.

The torque change request may be configured to instruct a torque increase or a torque decrease and to instruct a target torque to which a current torque is to be increased or decreased.

In step S120, in case that the torque change request is not received, it is determined whether an antilock brake system is in an active state.

The ESP system is able to send information including an ABS activation marker to the vehicle controller in real time, and the vehicle control system may determine whether the ABS is in an activated state according to the ABS activation marker. If the ABS activation marker indicates ABS activation, then it can be determined that the ABS is in the activated state. If the ABS activation marker indicates ABS non-activation, then it can be determined that the ABS is in the non-activated state.

In step S130, in case that the antilock brake system is in the active state, an energy recovery torque is decreased with a first torque change gradient.

If the ABS is in the activated state, then the energy recovery torque is required to be decreased in order to exit the energy recovery.

Optionally, the first torque change gradient may be set to be smaller than a predetermined value, in order to reduce the shock feeling caused by a sudden and excessively rapid change in the torque (that is, a sudden reduction in the vehicle deceleration). For example, the predetermined value may be 400 N·m/S (that is, the first torque change gradient is set to be less than 400 N·m/S). However, embodiments of the present application are not limited to this value, and the predetermined value may be set to any suitable value as required. In an optional condition, the first torque change gradient is set to satisfy that the energy recovery torque, when being decreased with the first torque change gradient, is enabled to be decreased to the preset value within the preset time. The preset time may range, for example, between 100 ms and 200 ms.

Optionally, the energy recovery torque is restricted to that a minimum value thereof is decreased to a preset torque, and a size of the preset torque is greater than 0.

For example, the preset torque may be −5 N·m, but embodiments of the present application are not limited thereto, and the preset torque may be set to be any suitable value. The reduction of the energy recovery torque mentioned herein refers to the reduction of the size of the energy recovery torque. By restricting that the minimum value of the energy recovery torque to a preset value of greater than 0, rather than equal to 0, it can be ensured that the transmission mechanism is still in a coupled state and the gear teeth beating phenomenon is reduced.

In step S140, during a process of decreasing the energy recovery torque, it is determined whether the antilock brake system is transited from the activated state to a non-activated state.

During the process of decreasing the energy recovery torque, it may be determined in real time whether the ABS is transited from the activated state to the non-activated state according to the marker sent from the ABS.

In step S150, in case that the antilock brake system is transited from the activated state to the non-activated state, it is determined whether it is satisfied that a first current driver demand torque is greater than a first preset value and the antilock brake system is in the non-activated state for longer than a first preset time.

During the process of decreasing the energy recovery torque, if the energy recovery torque has not been reduced to the preset torque yet while the ABS has been transited from the activated state to the non-activated state, then the energy recovery torque is stopped from reducing but is maintained at a current value, and in such condition, the step S150 is executed.

During the process of decreasing the energy recovery torque, when the energy recovery torque is decreased to the preset torque and the antilock brake system is in the activated state, the energy recovery torque is maintained to be the preset torque until the antilock brake system is transited from the activated state to the non-activated state.

Herein, the ABS being in the non-activated state for longer than the first preset time means the time for the ABS being in the non-activated state is longer than the first preset time. The first preset time may be set to be any suitable value ensuring that the ABS is completely in the non-activated state as required. For example, the first preset time may be set to be 10 s or the like.

If it is satisfied that the first current driver demand torque is greater than the first preset value and that the ABS is in the non-activated state for longer than the first preset time, then the step S160 is executed. If it is not satisfied that the first current driver demand torque is greater than the first preset value or that the ABS is in the non-activated state for longer than the first preset time, then the method returns to the step S130 for execution.

Specifically, if the ABS is in the non-activated state for no longer than the first preset time, it is indicated that the ABS is transited from the non-activated state to the activated state again, in such condition, no matter whether the driver demand torque is greater than the first preset value, the process of reducing the energy recovery torque is required to be continued, that is, the method returns to the step S130 for execution.

If the ABS is in the non-activated state for longer than the first preset time while the first driver demand torque is no greater than the first preset value, then the method may also return to the step S130 for execution. Or alternatively, in some expandable implementations, if the ABS is in the non-activated state for longer than the first preset time while the first driver demand torque is no greater than the first preset value, the current energy recovery torque may also be maintained unchanged, until the driver demand torque is greater than the first preset value.

In an embodiment of the present application, the first preset value is a value no smaller than 0. For example, the first preset value may be set to be 0. It may be understood that the driver demand torque is related to a throttle opening.

In step S160, when it is satisfied that the first current driver demand torque is greater than the first preset value and the antilock brake system is in the non-activated state for longer than the first preset time, the energy recovery torque is recovered to the first current driver demand torque with a second torque change gradient.

The second torque change gradient may be set to be smaller than a predetermined value, in order to reduce the shock feeling caused by a sudden and excessively rapid change in the torque (that is, a sudden reduction in the vehicle deceleration). For example, the predetermined value may be 600 N·m/S (that is, the second torque change gradient is set to be less than 600 N·m/S). However, embodiments of the present application are not limited to this value, and the predetermined value may be set to any suitable value as required.

According to that the ABS is in the non-activated state for longer than the first preset time, it may be determined that the ABS has been substantially in a completely non-activated state; and according to that the driver demand torque is greater than the first preset value, it may be determined that the driver doesn't need to execute the braking or coasting anymore, in such condition, the energy recovery torque may be recovered to the first current driver demand torque. In this way, frequent vehicle motion caused by frequent activation of the ABS can be avoided, thereby improving the comfort of the vehicle.

Figure 2:
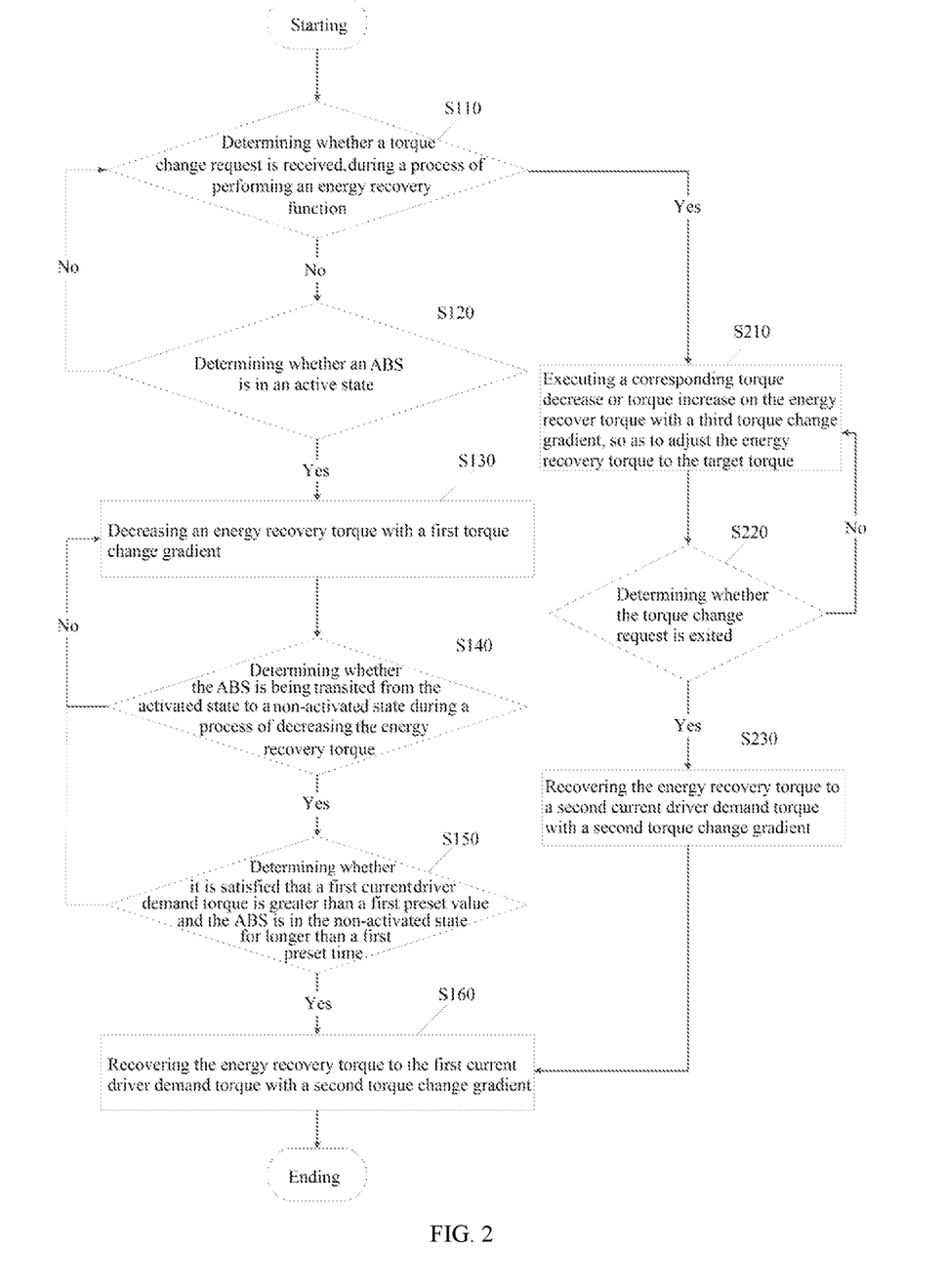
FIG. 2 is a flowchart of a torque control method for a vehicle according to another embodiment of the present application.

FIG. 2 shows a flowchart of a torque control method for a vehicle according to another embodiment of the present application. As shown in FIG. 2, based on the above embodiment, the torque control method for the vehicle according to this embodiment of the present application may further include steps S210 to S230.

In step S210, in case of receiving the torque change request, a corresponding torque decrease or torque increase is executed on the energy recover torque with a third torque change gradient, so as to adjust the energy recovery torque to the target torque.

The third torque change gradient may be set to be smaller than a predetermined value, in order to reduce the shock feeling caused by a sudden and excessively rapid change in the torque (that is, a sudden reduction in the vehicle deceleration). For example, the predetermined value may be 800 N·m/S (that is, the third torque change gradient is set to be less than 800 N·m/S). However, embodiments of the present application are not limited to this value, and the predetermined value may be set to any suitable value as required.

It can be understood that the first torque change gradient, the second torque change gradient, and the third torque change gradient in embodiments of the present application may be different from other another, in which, on the premise that all the torque change gradients satisfy the corresponding required condition, the third torque change gradient can be greater than the second torque change gradient, and the second torque change gradient can be greater than the first torque change gradient In step S220, it is determined whether the torque change request is exited.

In some conditions, if the vehicle controller doesn't receive the torque change request sent from the ESP anymore, it can be determined that the torque change request is exited. Or in some other conditions, if the target value in the torque change request is 0, it can be determined that the torque change request is exited. If a new torque change request having the target value being not 0, it is determined that the torque change request has not been exited, and the method may return to step S210 for execution.

In step S230, in case that the torque change request is exited, the energy recovery torque is recovered to a second current driver demand torque with a second torque change gradient.

When the torque change request is exited, the adjustment of the body posture of the vehicle by the ESP is completed. In this case, by recovering the energy recovery torque to the second current driver demand torque, the vehicle can be recovered to a normal driving state. In addition, as described in the above, the recovering of the recovery torque with the second torque change gradient can reduce the shock caused by sudden and excessive torque changes.

In embodiments of the present application, the first current driver demand torque and the second current driver demand torque are only used for distinction, rather than specific limitation. Similarly, the first torque change gradient, the second torque change gradient, and the third torque change gradient are only used for distinction, rather than specific limitation.

Figure 3:
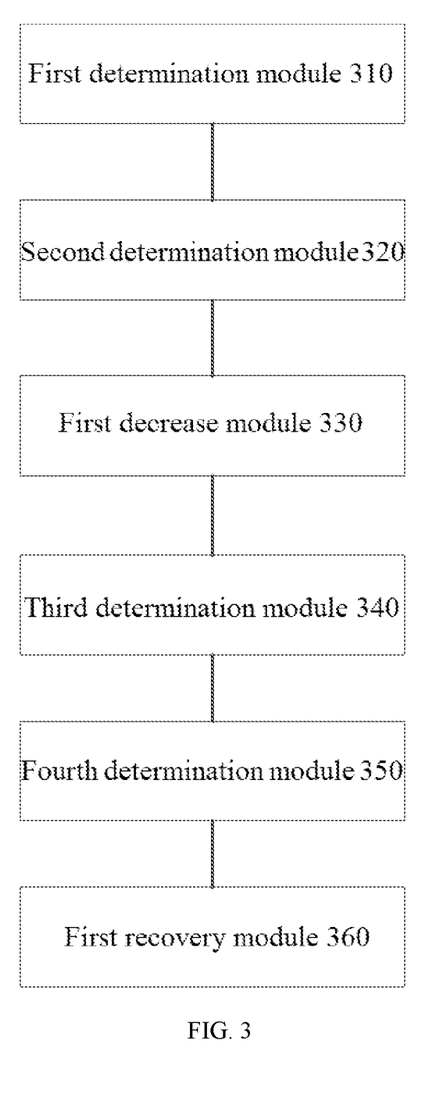
FIG. 3 is a structure block diagram of a torque control apparatus for a vehicle according to an embodiment of the present application.

FIG. 3 shows a structure block diagram of a torque control apparatus for a vehicle according to an embodiment of the present application. As shown in FIG. 3, the embodiment of the present application provides a torque control apparatus for a vehicle. The vehicle may be a hybrid vehicle or a pure electric vehicle, and the apparatus may be applied to a vehicle controller. The torque control apparatus for the vehicle may comprise: a first determination module 310, a second determination module 320, a first decrease module 330, a third determination module 340, a fourth determination module 350, and a first recovery module 360. The first determination module 310 is configured for determining whether a torque change request is received, during a process of performing an energy recovery function. The second determination module 320 is configured for determining whether an antilock brake system is in an active state, in case that the torque change request is not received. The first decrease module 330 is configured for decreasing an energy recovery torque with a first torque change gradient, in case that the antilock brake system is in the active state, in which, the energy recovery torque is restricted to that a minimum value thereof is decreased to a preset torque, and a size of the preset torque is greater than 0. The third determination module 340 is configured for determining whether the antilock brake system is transited from the activated state to a non-activated state, during a process of decreasing the energy recovery torque. The fourth determination module 350 is configured for determining whether it is satisfied that a first current driver demand torque is greater than a first preset value and the antilock brake system is in the non-activated state for longer than a first preset time, in case that the antilock brake system is transited from the activated state to the non-activated state. The first recovery module 360 is configured for recovering the energy recovery torque to the first current driver demand torque with a second torque change gradient, when it is satisfied that the first current driver demand torque is greater than the first preset value and the antilock brake system is in the non-activated state for longer than the first preset time. The torque control apparatus for the vehicle is able to prevent the frequent vehicle motion caused by frequent activation of the ABS, thereby improving the comfort of the vehicle.

In some optional implementations, the first torque change gradient is set to satisfy that the energy recovery torque, when being decreased with the first torque change gradient, is enabled to be decreased to the preset value within the preset time.

In some optional implementations, the torque control apparatus for the vehicle further comprises: a maintenance module, configured for maintaining, during the process of decreasing the energy recovery torque when the energy recovery torque is decreased to the preset torque and the antilock brake system is in the activated state, the energy recovery torque to be the preset torque until the antilock brake system is transited from the activated state to the non-activated state.

In some optional implementations, the torque control apparatus for the vehicle further comprises: a returning module, configured for returning to the step of decreasing the energy recovery torque with the first torque change gradient, when it is satisfied that the first current driver demand torque is greater than the first preset value and the antilock brake system is in the non-activated state for longer than the first preset time.

The torque change request is configured to instruct a torque increase or a torque decrease and to instruct a target torque. In some optional implementations, the torque control apparatus for the vehicle further comprises: a torque adjustment module, a fifth determination module, and a second recovery module. The torque adjustment module is configured for executing, in case of receiving the torque change request, a corresponding torque decrease or torque increase on the energy recover torque with a third torque change gradient, so as to adjust the energy recovery torque to the target torque. The fifth determination module is configured for determining whether the torque change request is exited. The second recovery module is configured for recovering the energy recovery torque to a second current driver demand torque with a second torque change gradient, in case that the torque change request is exited.

In some optional implementations, the first torque change gradient may be set to be smaller than 400 N·m/S; the second torque change gradient may be set to be smaller than 600 N·m/S; or the third torque change gradient may be set to be smaller than 800 N·m/S.

The specific working principle and advantages of the torque control apparatus for the vehicle according to embodiments of the present application are similar to the specific working principle and advantages of the torque control method for the vehicle according to the above-described embodiments of the present application, which thus will not repeated herein.

Correspondingly, embodiments of the present application further provides a machine-readable storage medium, comprising instructions which, when executed by a machine, cause the machine to carry out the torque control method for the vehicle according to any embodiments of the present application.

The machine-readable storage media includes both permanent and non-permanent, and removable and non-removable media, and can be implemented by any method or technology for information storage. Examples of machine-readable storage media include, but are not limited to, phase-change memory (PRAM), static random access memory (SRAM), dynamic random access memory (DRAM), other types of random access memories (RAM), only read-only memory (ROM), electrically erasable programmable read-only memory (EEPROM), flash memory (Flash Memory) or other memory technologies, compact disc read-only memory (CD-ROM), digital versatile disc (DVD) or other optical storage, magnetic cassette tapes, magnetic tape-disc storage or other magnetic storage devices, and various other non-transmission media that can be used to store information accessible by other computing devices.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

What is claimed is:

1. A torque control method for a vehicle, being implemented by a vehicle controller, the method comprising:
determining, by the vehicle controller, whether a torque change request sent from an electronic stability program, is received, during a process of performing an energy recovery function;
determining, by the vehicle controller, whether an antilock brake system is in an active state, in case that the torque change request is not received;
decreasing an energy recovery torque with a first torque change gradient, in case that the antilock brake system is in the active state, wherein the energy recovery torque is restricted to that a minimum value thereof is decreased to a preset torque, and a size of the preset torque is greater than 0;
determining whether the antilock brake system is transited from the activated state to a non-activated state, during a process of decreasing the energy recovery torque;
determining whether it is satisfied that a first current driver demand torque is greater than a first preset value and the antilock brake system is in the non-activated state for longer than a first preset time, in case that the antilock brake system is transited from the activated state to the non-activated state; and
recovering the energy recovery torque to the first current driver demand torque with a second torque change gradient, when it is satisfied that the first current driver demand torque is greater than the first preset value and the antilock brake system is in the non-activated state for longer than the first preset time.

2. The torque control method for the vehicle according to claim 1, further comprising:
maintaining, during the process of decreasing the energy recovery torque when the energy recovery torque is decreased to the preset torque and the antilock brake system is in the activated state, the energy recovery torque to be the preset torque until the antilock brake system is transited from the activated state to the non-activated state.

3. The torque control method for the vehicle according to claim 1, further comprising:
returning to the step of decreasing the energy recovery torque with the first torque change gradient, when it is satisfied that the first current driver demand torque is greater than the first preset value and the antilock brake system is in the non-activated state for longer than the first preset time.

4. The torque control method for the vehicle according to claim 1, wherein the torque change request is configured to instruct a torque increase or a torque decrease and to instruct a target torque; and the torque control method for the vehicle further comprises:
executing, in case of receiving the torque change request, a corresponding torque decrease or torque increase on the energy recover torque with a third torque change gradient, so as to adjust the energy recovery torque to the target torque;
determining whether the torque change request is exited; and
recovering the energy recovery torque to a second current driver demand torque with a second torque change gradient, in case that the torque change request is exited.

5. The torque control method for the vehicle according to claim 4, wherein at least one of the following features is defined:
the first torque change gradient is smaller than 400 N·m/S;
the second torque change gradient is smaller than 600 N·m/S; or the third torque change gradient is smaller than 800 N·m/S.

6. The torque control method for the vehicle according to claim 1, wherein the first torque change gradient is set to satisfy that the energy recovery torque, when being decreased with the first torque change gradient, is enabled to be decreased to the preset value within the preset time.

7. The torque control method for the vehicle according to claim 5, wherein the first torque change gradient is set to satisfy that the energy recovery torque, when being decreased with the first torque change gradient, is enabled to be decreased to the preset value within the preset time.

8. A vehicle controller, comprising:
   a processor, and
   a storage medium storing instructions, which, when being executed by the processor, cause the vehicle controller to carry a method comprising:
   determining whether a torque change request is received, during a process of performing an energy recovery function;
   determining whether an antilock brake system is in an active state, in case that the torque change request is not received;
   decreasing an energy recovery torque with a first torque change gradient, in case that the antilock brake system is in the active state, wherein the energy recovery torque is restricted to that a minimum value thereof is decreased to a preset torque, and a size of the preset torque is greater than 0;
   determining whether the antilock brake system is transited from the activated state to a non-activated state, during a process of decreasing the energy recovery torque;
   determining whether it is satisfied that a first current driver demand torque is greater than a first preset value and the antilock brake system is in the non-activated state for longer than a first preset time, in case that the antilock brake system is transited from the activated state to the non-activated state; and
   recovering the energy recovery torque to the first current driver demand torque with a second torque change gradient, when it is satisfied that the first current driver demand torque is greater than the first preset value and the antilock brake system is in the non-activated state for longer than the first preset time.

9. The vehicle controller according to claim 8, wherein the method further comprises:
   maintaining, during the process of decreasing the energy recovery torque when the energy recovery torque is decreased to the preset torque and the antilock brake system is in the activated state, the energy recovery torque to be the preset torque until the antilock brake system is transited from the activated state to the non-activated state.

10. The vehicle controller according to claim 8, wherein the method further comprises:
    a returning module, configured for returning to the step of decreasing the energy recovery torque with the first torque change gradient, when it is satisfied that the first current driver demand torque is greater than the first preset value and the antilock brake system is in the non-activated state for longer than the first preset time.

11. The vehicle controller according to claim 8, wherein the torque change request is configured to instruct a torque increase or a torque decrease and to instruct a target torque; and the method further comprising:
    executing, in case of receiving the torque change request, a corresponding torque decrease or torque increase on the energy recover torque with a third torque change gradient, so as to adjust the energy recovery torque to the target torque;
    determining whether the torque change request is exited; and
    recovering the energy recovery torque to a second current driver demand torque with a second torque change gradient, in case that the torque change request is exited.

12. The vehicle controller according to claim 11, wherein at least one of the following features is defined:
    the first torque change gradient is smaller than 400 N·m/S;
    the second torque change gradient is smaller than 600 N·m/S; or
    the third torque change gradient is smaller than 800 N·m/S.

13. The vehicle controller according to claim 8, wherein the first torque change gradient is set to satisfy that the energy recovery torque, when being decreased with the first torque change gradient, is enabled to be decreased to the preset value within the preset time.

14. A non-transitory machine-readable storage medium, comprising instructions, which, when executed by a processor of a vehicle controller, cause the vehicle controller to carry out a method comprising:
    determining, whether a torque change request sent from an electronic stability program, is received, during a process of performing an energy recovery function;
    determining, whether an antilock brake system is in an active state, in case that the torque change request is not received;
    decreasing an energy recovery torque with a first torque change gradient, in case that the antilock brake system is in the active state, wherein the energy recovery torque is restricted to that a minimum value thereof is decreased to a preset torque, and a size of the preset torque is greater than 0;
    determining whether the antilock brake system is transited from the activated state to a non-activated state, during a process of decreasing the energy recovery torque;
    determining whether it is satisfied that a first current driver demand torque is greater than a first preset value and the antilock brake system is in the non-activated state for longer than a first preset time, in case that the antilock brake system is transited from the activated state to the non-activated state; and
    recovering the energy recovery torque to the first current driver demand torque with a second torque change gradient, when it is satisfied that the first current driver demand torque is greater than the first preset value and the antilock brake system is in the non-activated state for longer than the first preset time.

15. The non-transitory machine-readable storage medium according to claim 14, wherein the method further comprises:
    maintaining, during the process of decreasing the energy recovery torque when the energy recovery torque is decreased to the preset torque and the antilock brake system is in the activated state, the energy recovery torque to be the preset torque until the antilock brake system is transited from the activated state to the non-activated state.

16. The non-transitory machine-readable storage medium according to claim 14, wherein the method further comprises:
    returning to the step of decreasing the energy recovery torque with the first torque change gradient, when it is satisfied that the first current driver demand torque is greater than the first preset value and the antilock brake system is in the non-activated state for longer than the first preset time.

17. The non-transitory machine-readable storage medium according to claim 14, wherein the torque change request is configured to instruct a torque increase or a torque decrease and to instruct a target torque; and the method further comprises:

executing, in case of receiving the torque change request, a corresponding torque decrease or torque increase on the energy recover torque with a third torque change gradient, so as to adjust the energy recovery torque to the target torque;

determining whether the torque change request is exited; and recovering the energy recovery torque to a second current driver demand torque with a second torque change gradient, in case that the torque change request is exited.

18. The non-transitory machine-readable storage medium according to claim 17, wherein at least one of the following features is defined:

the first torque change gradient is smaller than 400 N·m/S;

the second torque change gradient is smaller than 600 N·m/S; or the third torque change gradient is smaller than 800 N·m/S.

19. The non-transitory machine-readable storage medium according to claim 14, wherein the first torque change gradient is set to satisfy that the energy recovery torque, when being decreased with the first torque change gradient, is enabled to be decreased to the preset value within the preset time.

20. The torque control method for the vehicle according to claim 2, further comprising:

returning to the step of decreasing the energy recovery torque with the first torque change gradient, when it is satisfied that the first current driver demand torque is greater than the first preset value and the antilock brake system is in the non-activated state for longer than the first preset time.

* * * * *